(12) United States Patent
Chen et al.

(10) Patent No.: US 7,702,053 B2
(45) Date of Patent: Apr. 20, 2010

(54) STATE BASED ALGORITHM TO MINIMIZE MEAN SQUARED ERROR

(75) Inventors: Chung-Jue Chen, Irvine, CA (US); Vasudevan Parthasarathy, Irvine, CA (US); Afshin Momtaz, Laguna Hills, CA (US); Hong Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1077 days.

(21) Appl. No.: 11/124,598

(22) Filed: May 5, 2005

(65) Prior Publication Data

US 2006/0251195 A1 Nov. 9, 2006

(51) Int. Cl.
*H04B 1/10* (2006.01)
(52) U.S. Cl. .................. 375/348; 375/350
(58) Field of Classification Search ......... 375/229–236, 375/348, 350
See application file for complete search history.

(56) References Cited

U.S. PATENT DOCUMENTS

| | | | | |
|---|---|---|---|---|
| 5,276,707 A | * | 1/1994 | Baum | 375/233 |
| 5,812,603 A | * | 9/1998 | Luthi et al. | 375/287 |
| 5,914,983 A | * | 6/1999 | Bowser et al. | 375/232 |
| 6,075,569 A | * | 6/2000 | Lee et al. | 348/554 |
| 6,144,697 A | * | 11/2000 | Gelfand et al. | 375/233 |
| 6,907,064 B1 | * | 6/2005 | Tokunaga et al. | 375/232 |
| 7,209,433 B2 | * | 4/2007 | Scarpa | 370/206 |
| 7,342,981 B2 | * | 3/2008 | Wongwirawat et al. | 375/326 |
| 7,346,105 B2 | * | 3/2008 | Endres et al. | 375/233 |
| 2002/0163960 A1 | * | 11/2002 | Blodgett et al. | 375/232 |
| 2002/0172276 A1 | * | 11/2002 | Tan et al. | 375/233 |
| 2002/0181573 A1 | * | 12/2002 | Dohmen et al. | 375/229 |
| 2003/0031244 A1 | * | 2/2003 | Vaidyanathan | 375/233 |
| 2003/0182664 A1 | * | 9/2003 | Lusky et al. | 725/111 |
| 2003/0223489 A1 | * | 12/2003 | Smee et al. | 375/233 |
| 2004/0001538 A1 | * | 1/2004 | Garrett | 375/229 |
| 2004/0005001 A1 | * | 1/2004 | Jones et al. | 375/232 |
| 2004/0091038 A1 | * | 5/2004 | Agazzi et al. | 375/233 |
| 2004/0196897 A1 | * | 10/2004 | Tan et al. | 375/233 |
| 2004/0228397 A1 | * | 11/2004 | Bach | 375/232 |
| 2004/0257253 A1 | * | 12/2004 | Jones et al. | 341/143 |
| 2005/0008070 A1 | * | 1/2005 | Wang et al. | 375/232 |
| 2005/0018765 A1 | * | 1/2005 | Endres et al. | 375/233 |
| 2005/0135470 A1 | * | 6/2005 | Momtaz | 375/233 |
| 2005/0271137 A1 | * | 12/2005 | Kolze et al. | 375/233 |
| 2007/0147489 A1 | * | 6/2007 | Sun et al. | 375/231 |
| 2008/0043829 A1 | * | 2/2008 | Shiue et al. | 375/232 |
| 2008/0107168 A1 | * | 5/2008 | Xia et al. | 375/233 |

\* cited by examiner

*Primary Examiner*—Temesghen Ghebretinsae

(57) ABSTRACT

Data error such as mean square error may be reduced in a system such as a communication receiver using a dithering algorithm that adjusts one or more parameters in the system. The dithering algorithm may be applied to more than one parameter. The dithering algorithm may include a state machine to alter the rate of change dependent on the state of the dithering algorithm.

7 Claims, 7 Drawing Sheets

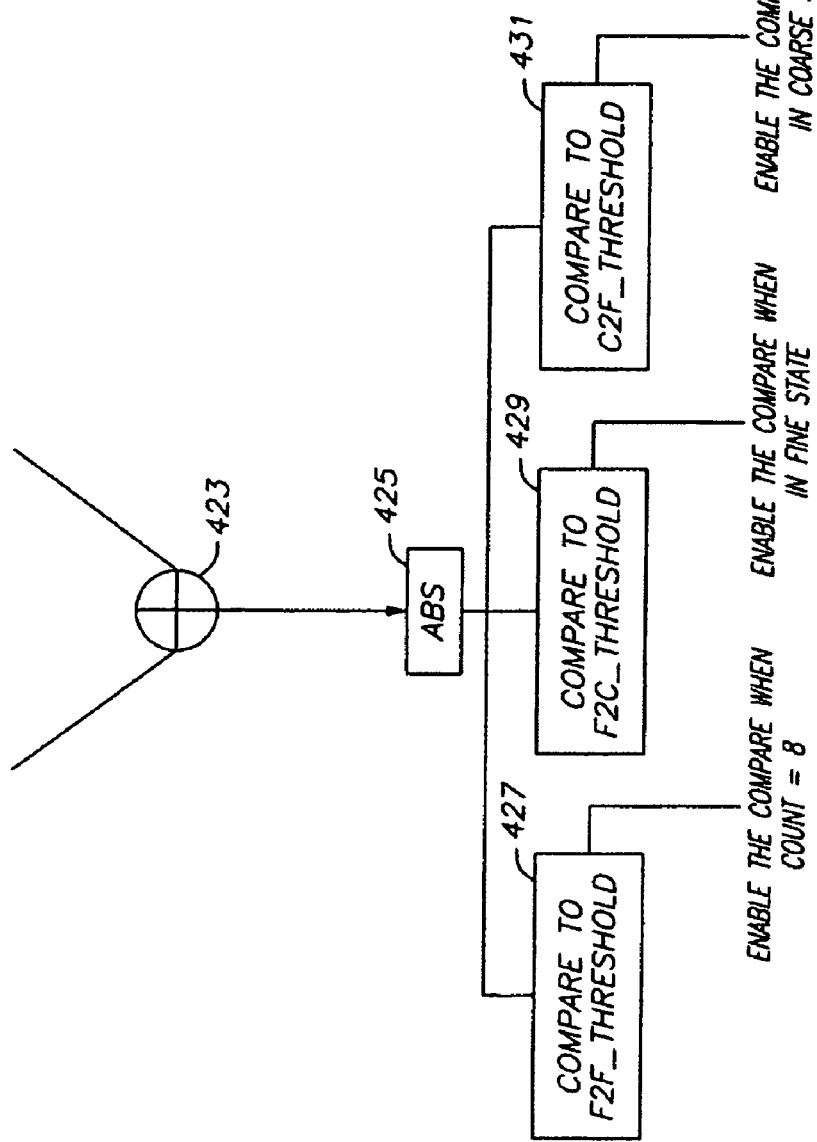

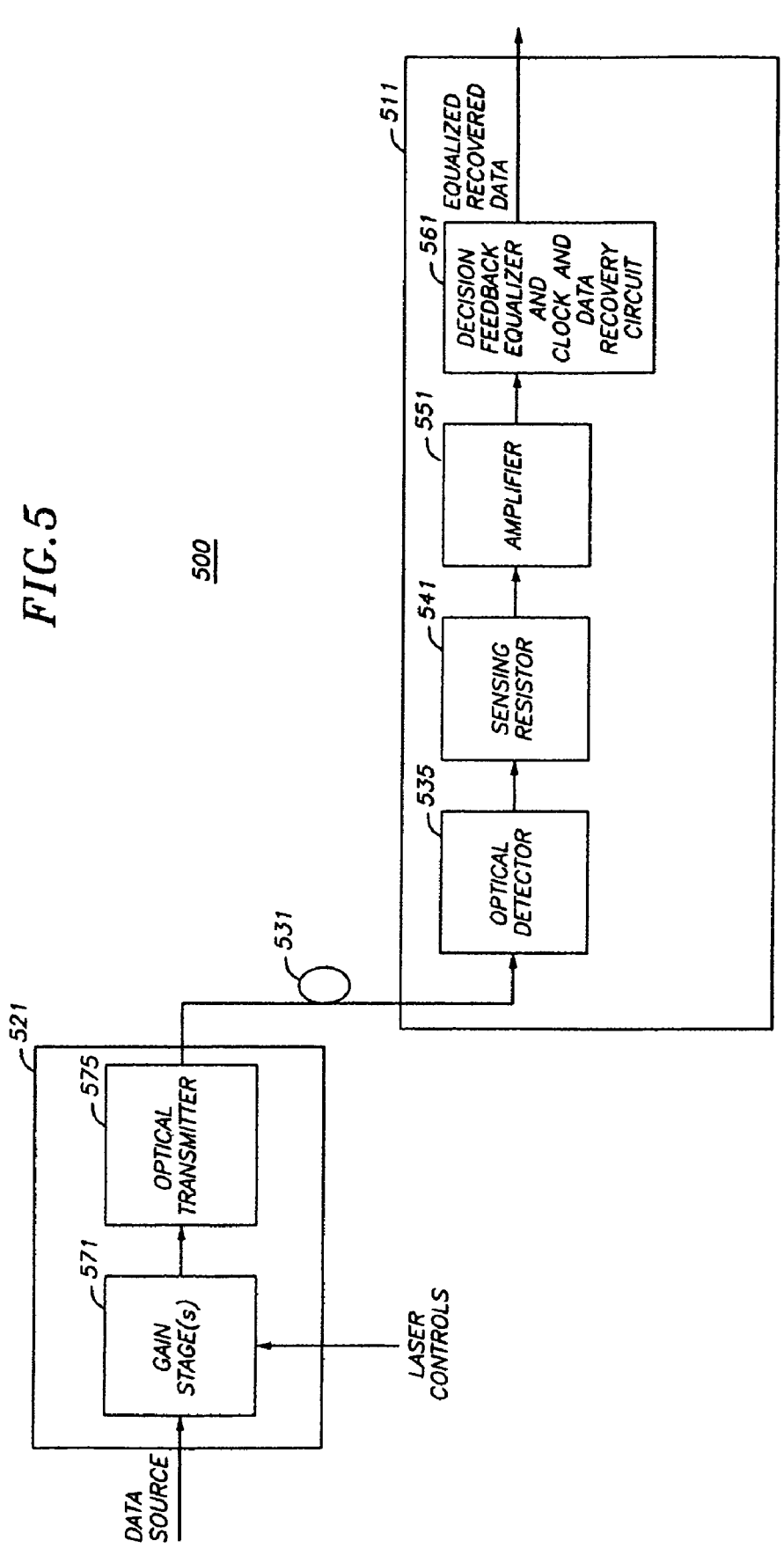

STATE BASED ALGORITHM TO MINIMIZE MEAN SQUARED ERROR

FIELD OF INVENTION

The embodiments of this invention relate to optimizing parameters using a dithering algorithm. Specifically, the embodiments relate to a system and method for reducing error in data signals by controlling a set of control loops based on error signal feedback using a multistate dithering algorithm.

BACKGROUND OF THE INVENTION

In a typical data communications system, data is sent from a transmitter to a receiver over a communications media such as a wire or fiber optic cable. In general, the data is encoded in a manner that facilitates effective transmission over the media. For example, data may be encoded as a stream of binary data (e.g., symbols) that is transmitted through the media as a signal.

In many applications, symbols in a data stream are corrupted as they pass through the media. For example, bandwidth limitations inherent in the media tend to create increasing levels of data distortion in a received signal. In particular, band-limited channels tend to spread transmitted pulses. If the width of the spread pulse exceeds a symbol duration, overlap with neighboring pulses may occur, degrading the performance of the receiver. This phenomenon is called inter-symbol interference ("ISI"). In general, as the data rate or the distance between the transmitter and receiver increases, the bandwidth limitations of the media tend to cause more inter-symbol interference.

To compensate for such problems in received signals, conventional high speed receivers may include filters and equalizers that may, for example, cancel some of the effects of inter-symbol interference or other distortion. Moreover, some applications use adaptive filters or equalizers that automatically adjust their characteristics in response to changes in the characteristics of the communications media. Typically, the adaptation process involves generating coefficients that control the characteristics of the filter or equalizer. To this end, a variety of algorithms have been developed for generating these coefficients.

The least mean square ("LMS") algorithm is commonly used for optimizing coefficients for various applications such as a finite impulse response ("FIR") filter and an adaptive equalizer such as decision feedback equalizers ("DFE"). In general, an LMS algorithm generates adaptive coefficients by modifying the current coefficients based on an algorithm that takes into account current and prior samples of the received data. For example, for a two tap DFE the LMS algorithm may be described by the following equations:

$$g1(n)=g1(n-1)+\mu*e*y1 \quad \text{EQUATION 1}$$

$$g2(n)=g2(n-1)+\mu*e*y2 \quad \text{EQUATION 2}$$

where g(n−1) represents the coefficient immediately preceding coefficient (n), μ is a scalar that relates to, for example, the gain of a feedback loop and the speed with which the loop converges, e is an error signal, and y1 and y2 are prior samples of the received data.

The LMS algorithm is not suitable for applications where prior samples of the received data are not available. For example, a conventional continuous time filter does not generate prior states of the data passing through the filter. Accordingly, a variety of techniques may need to be used to adjust characteristics of components in a receiver.

In view of the above, a need exists for improved techniques for reducing errors in data signals, in particular in applications where multiple techniques may be used to control processing of the data signals.

SUMMARY OF THE INVENTION

A system and method for communicating information, substantially as shown in and described in connection with at least one of the figures, as set forth more completely in the claims.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this discussion are not necessarily to the same embodiment, and such references mean at least one.

FIG. 4B is a diagram of one embodiment of a circuit to compare a change in coefficient value with a set of threshold values.

FIG. 5 is a diagram of one embodiment of a communication system.

Figure 1:
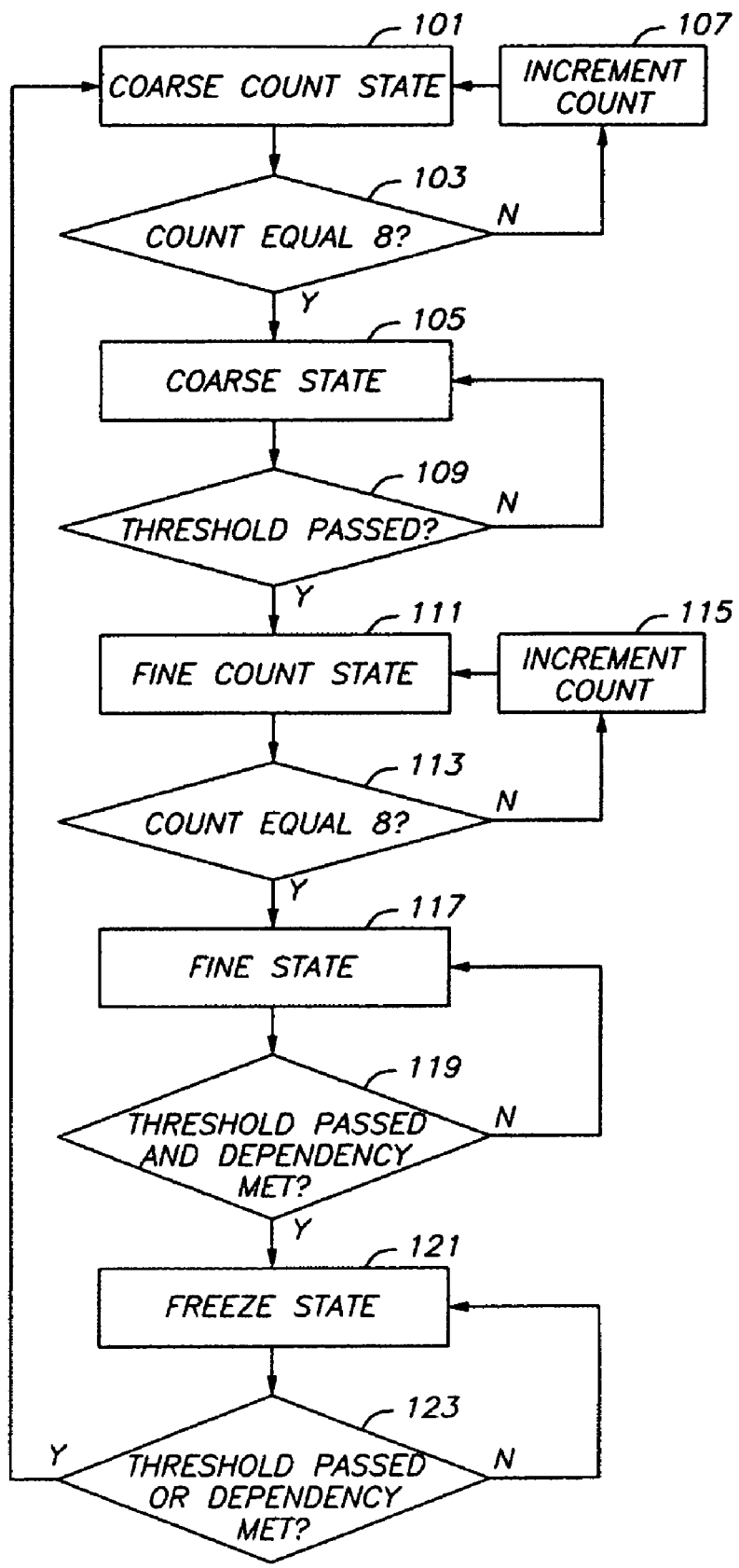
FIG. 1 is a flowchart of one embodiment of a process for optimizing a parameter.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION OF THE INVENTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

FIG. 1 is a flowchart of one embodiment of a process for optimizing a parameter. The process may be utilized to optimize a single parameter or a set of parameters. The process may be utilized to continuously update and optimize the parameters. For example, communications systems such as fiber optic communications systems have a set of feedback loops that include equalizers and filters that adjust an incoming signal to compensate for distortion of the signal over the communication medium. The filters and equalizers each have a coefficient that is adjustable to allow the filters and equalizers to be adjusted to improve the quality of the adjusted signal based on the changing conditions of the communication medium and similar conditions. The optimization process is utilized in this context to assist in the determination of the coefficients over time.

The direction of adjustment for a parameter, for example larger or smaller coefficients, may be based on an analysis of an error signal or other signal. If a change to a parameter causes an improvement in the error signal then the parameter may be further adjusted in the same direction. If the adjustment causes an increase in an error signal then the parameter may be adjusted in the opposite direction until an optimized parameter value is obtained. In one embodiment, an error signal may be a squared error signal, such as a mean squared error, or similar error signal.

In one embodiment, the optimization process adjusts the granularity at which a parameter is adjusted, controls the rate of change or frequency of change. In one embodiment, the optimization process utilizes a state machine that includes a set of states corresponding to a setting for the level of granularity for changing a parameter. Levels of granularity may be measured in step sizes, increments or similar characteristics controlling the adjustment of a parameter. In one embodiment, the optimization process incorporates three states, with a first state having a large adjustment size or coarse adjustment size, a second state having a smaller adjustment size or fine adjustment size and a hold or freeze state. The different adjustment sizes affect the speed at which an optimum parameter value may be obtained. A large adjustment size allows the process to more quickly approach an optimum value if an initial parameter value is far from an optimum value. However, a large adjustment size may continually overshoot an optimum value. A fine or small adjustment size can more accurately pinpoint an optimum value, but a larger number of iterations is required to reach the optimal value due to the small step size. In another embodiment, microcoding or other techniques may be substituted for a state machine. In a further embodiment, any number of states may be utilized in the state machine.

In one embodiment, the state machine of the optimization process may be initiated in a coarse state (block 101). A coarse state has a large step size to allow quick progression in adjusting a parameter toward an optimum value. For example, a course state may have a step size of two. This step size may be in any unit or size dependent on the type of parameter being adjusted and the context in which it is adjusted. Parameters with a wide range may have a proportionately large step size, while parameters with a small range have a proportionately small step size. In an initial coarse state, there may be insufficient feedback data to determine when a transition to a fine state is needed. The feedback data indicates the effect of a current parameter value on an error signal and tracking the feedback over time indicates trends in this process. The error signal, an approximation thereof or resulting parameters or changes in the parameter may be the feedback data. The initial coarse state may prevent transitions until a requisite amount of feedback data has been collected. For example, an initial coarse state tracking changes in a coefficient over time related to a communication signal may require that eight samples be taken before a transition to another state is permitted. Any number of samples may be required to determine when the state may be altered. In one embodiment, the number of samples taken ranges from eight to sixteen. In one embodiment, this value may be programmable. An administrator of the device may set the programmable sample number value based on experimental results or other factors.

In one embodiment, the optimization process periodically checks if the requisite amount of feedback data has been collected (block 103). In one embodiment, a check is made if a defined amount of time, clock cycles or similar indicators have lapsed or a check of a storage structure is made to determine if sufficient data has been stored therein. If sufficient data has not been collected, then data collection continues. For each additional sample collected a counter or other tracking mechanism is incremented (block 107), until a total data count is met or exceeded.

In one embodiment, the current state is adjusted to allow transition to another state or a transition to a related state is made. For example, a standard coarse state may be entered from an initial coarse state or include an initial course state (block 105), wherein transition to a fine state is permitted if a defined threshold is met or passed. The threshold is based on the feedback being tracked. The data samples of the feedback are added together or approximations of the values are added together. In one embodiment, if the current accumulated feedback or indicators fall below the threshold level, then the state machine transitions to a fine state (block 109). In another embodiment, the tracking of the feedback may be inverted and a transition occurs when the threshold is exceeded. The feedback or approximation thereof falling below a threshold may indicate that the parameter value has neared an optimal value and finer tuning is needed to obtain the optimal value or approach it.

In one embodiment, the fine state is correlated with a smaller step size or finer granularity in adjusting the parameter. For example, the step size for the fine state may be a step size of one, in comparison to the step size of two for the coarse state. Transition out of the fine state may be disabled until a requisite amount of feedback (e.g., changes in a coefficient value) has been collected that reflects the change in state (block 111). For example, a minimum of eight data samples may be required before further transition is permitted. Similar to the coarse state, a check is periodically made to determine if the requisite data has been collected (block 113). This disabled transition state may be an initial fine state that may be considered part of the fine state or a separate state. If insufficient data is available then the collection of data continues and a counter or similar tracking system is incremented as each additional point of data is collected (block 115).

In one embodiment, if the requisite data has been collected then the transition to another state is enabled (block 117). The step size remains the same. A second threshold value is checked against the accumulated error data (block 119). In one embodiment, the second threshold is lower or more restricted than the first threshold, requiring a smaller error rate. In another embodiment, the accumulation or quantification of error data may be inverted and a transition occurs when the threshold is exceeded. If the threshold is met it indicates a close proximity to an optimal parameter value. In one embodiment, the data sample size is programmable.

In one embodiment, a transition to a freeze or hold state is made if the threshold is met (block 121). The freeze state locks the value of the parameter. Locking the parameter prevents inefficiency and improves performance of an function associated with the parameter. Without the freeze state the value of the parameter would continuously shift around an optimal value that on average may result in poorer performance than a locked value close to the optimal value. In one embodiment, the parameter value that is locked in is an average of recent parameter values. In another embodiment, the parameter value locked in is the last value prior to the transition to the freeze state or a similar approximation of the optimal value.

In one embodiment, a transition to the freeze state may be predicated on conditions in addition to the threshold value. Any other condition or parameter may be included as a requirement for the freeze state. For example, parameters or functions affected by the parameter to be frozen may be included to prevent a freeze that may be adverse or inefficient for other functions. In one embodiment, multiple instances of the optimization process control parameters of different functions in a device or system. These separate optimization process instances may be interdependent. In one embodiment, the condition of one optimization process may affect the other. For example, an optimization process adjusting the coefficient for a continuous time filter may prevent entry into a freeze state until a separate optimization process for a phase adjust circuit enters a freeze state. The phase adjust circuit may have a slower reaction or convergence time than the continuous time filter. Thus, allowing the continuous time filter to enter a freeze state before a phase adjust circuit reaches convergence may be counter productive as the changes to the phase adjust may disrupt the continuous time filter settings requiring further adjustment.

In one embodiment, in the freeze state, a continuous or periodic monitoring of the error signal may be made (block 123). If the change in the error signal from a baseline value exceeds a threshold value or similar criteria are met, then the state machine may transition out of the freeze state to a coarse state or similar state (block 101). In one embodiment, other conditions may force an exit from the freeze state including other instances of the optimization process exiting the freeze state or similar conditions. For example, an exit of either optimization process for related continuous time filter and phase adjust devices results in the other optimization process exiting the freeze state.

Figure 2:
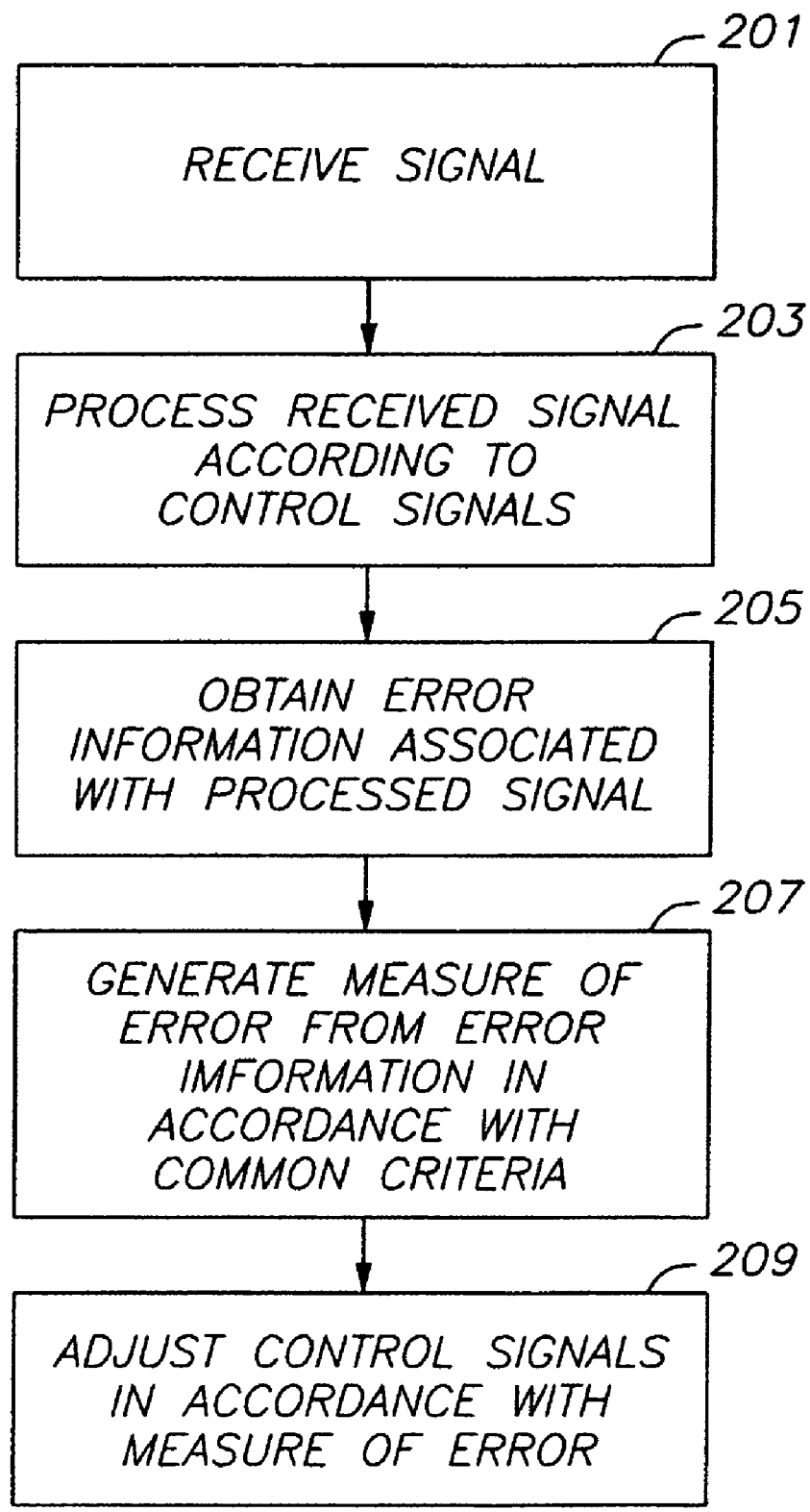
FIG. 2 is a flowchart of one embodiment of a process for processing a signal.

FIG. 2 is a flowchart of one embodiment of a process of a device for processing a signal. This process may be a larger process in which the optimization process of FIG. 1 is utilized in the form of a dithering algorithm. One of ordinary skill in the art would understand that the optimization process may be utilized in other similar larger processes and systems. The process of FIG. 2 is an example use of the optimization process.

In one embodiment, the signal processing device initially receives an input signal to be processed (block 201). In a typical embodiment, the input signal consists of a serial data stream. It should be appreciated, however, that the teachings herein are applicable to other signal formats. The device processes the input signal in accordance with several control signals (block 203). The device may include several processing components that perform various operations to, for example, attempt to accurately extract the original data stream from the received signal stream. To optimize the performance of the device, the characteristics of the components may be adjusted by the control signals. The control signals may be adjusted to, for example, minimize an error criteria associated with the processed signal. In one embodiment, a signal error acquisition component samples the signal stream and generates an error signal indicative of the difference between the value of the sampled signal and an expected value for the signal (block 205).

In one embodiment, an error calculation component processes the error signals to generate a measure of error information (e.g., a mean square error "MSE") (block 207) that is used to adjust the control signals (block 209). In some applications the same error information may be used to adjust each of the control signals. In other applications the error calculation component may generate different error information for different control signals. In either case, the error information is associated with common error measurement criteria.

In an alternative embodiment, the signal error acquisition component and the error calculation component may generate a bit error rate associated with the processed data. In this case, the bit error rate may form the basis of the error information that is used for adjusting each of the control signals. The control signal generators adjust the control signals (e.g., modify coefficient values) according to the error information. In a typical example, a control signal generator adjusts the value of a control signal to minimize the magnitude of the measure of error information (e.g., MSE). In addition, adjustment of multiple control loops may need to be coordinated because the control loops are interdependent. As discussed herein, this is accomplished using the optimization process described above in the form of a dithering algorithm. The dithering algorithm also functions to optimize the efficiency of the signal processing by quickly identifying the best coefficients for control loops and locking them in, as well as, adapting to changes in the communication medium.

Figure 3:
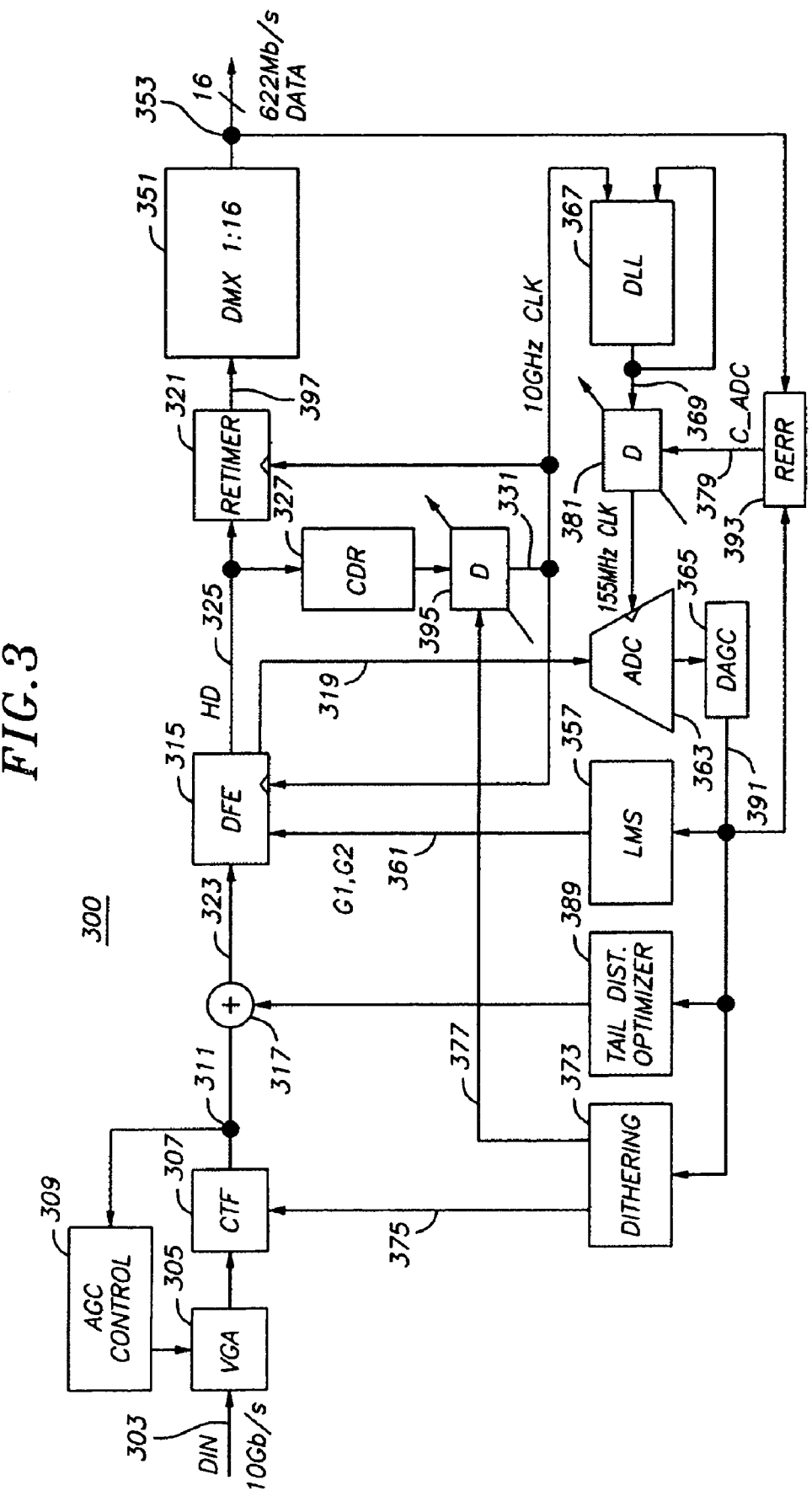
FIG. 3 is a simplified diagram of one embodiment of a receiver device.

FIG. 3 is a simplified diagram of one embodiment of a communication receiver 300 that incorporates four interdependent control loops, two of which are adjusted in accordance with a square error associated with a received signal. This receiver is another example embodiment of the use of the optimization process of FIG. 1. The receiver is a 10 Gbit receiver that employs an adjustable continuous time filter and a decision feedback equalizer ("DFE") to reduce errors in a received signal. The receiver 300 also includes a clock recovery circuit and an analog to digital clock ("ADC") circuit, both of which include mechanisms for adjusting the phase of the generated clock. It should be appreciated, however, that the optimization process is equally applicable to other applications including other receiver types, architectures, data rates and control loops.

In the embodiment of FIG. 3, a dithering algorithm circuit 373 implementing the optimization process generates several signals to control the operations of various components in the receiver 300. For example, a bandwidth adjust signal 375 controls the bandwidth of the continuous time filter ("CTF") 307. A phase adjust signal 377 adjusts the phase of a signal 331 generated by a clock and data recovery circuit ("CDR") 327 via a phase adjust circuit 395. In addition, the phase adjusted signal 331 affects the timing of a clock 369 generated by a delay lock loop ("DLL") 367 for an analog to digital converter ("ADC") 363. In another embodiment, the dithering algorithm may control any number of coefficients, values, loops or other parameters. The optimization process may be used for multiple purposes including determining coefficients for a continuous time filter, phase adjust circuit, threshold adjustment loop, a decision feedback equalizer or similar purposes.

In some embodiments, the dithering algorithm circuit 373 modifies the signals 375 and 377 according to a mean square error associated with a received data signal. In FIG. 3, the mean square error is calculated from a soft decision signal 319 generated by a decision feedback equalizer 315.

The dithering algorithm circuit 373 may reduce the MSE in the receiver 300 by measuring the MSE, then adjusting one or more of the signals 375 and 377, then re-measuring the MSE to compare the new MSE with the prior MSE. If the MSE decreased, the circuit 373 continues to adjust the signals in the same direction (e.g., up or down) as before. If the MSE increased, the circuit 373 adjusts the signals in the opposite direction. The following equation describes one example of a dithering algorithm:

$$c(n)=c(n-1)+u(n)$$

$$u(n)=u(n-1) \text{ if } MSE(n)<MSE(n-1)$$

$$u(n)=-1*u(n-1) \text{ if } MSE(n)>MSE(n-1) \quad \text{EQUATION 3}$$

where c is a coefficient or other parameter to be adjusted and u is a unit of adjustment to the coefficient.

Also, as described above the size of the adjustment of the signals is dependent on a state of the dithering device 373. The dithering device 373 having a coarse, fine and freeze state. In one embodiment, the dithering device 373 may execute or support multiple instances of an optimization process. Each instance may control a separate parameter such as a different coefficient value for the receiver 300. The instances may be interdependent. The instances may have conditions on transitions between states that are dependent on the state of the other instances. For example, an instance controlling a continuous time filter 307 enters a freeze state only when an instance for a phase shifter 395 is in a freeze state or leaves a freeze state when an instance for a phase shifter 395 leaves the freeze state.

Upon receiving an input data signal 303 from, for example, an optical channel, the receiver 300 initially amplifies and filters the signal 303. A variable gain amplifier ("VGA") 305 amplifies the input data signal 303 and provides the amplified data signal to the continuous time filter 307. The continuous time filter 307 filters the data signal using, for example, a low pass filter that has an adjustable bandwidth. In the embodiment of FIG. 3, the dithering algorithm circuit 373 uses the bandwidth adjust signal 375 to control the bandwidth of the continuous time filter 307. As a result, the dithering algorithm circuit 373 may reduce the mean square error of the received signal.

An example of a continuous time filter having an adjustable bandwidth is disclosed in U.S. patent application Ser. No. 10/774,724, filed Feb. 9, 2004, the disclosure of which is hereby incorporated by reference herein. An example of a variable gain amplifier and a continuous time filter is disclosed in commonly owned U.S. patent application Ser. No. 10/841,766, filed May 7, 2004, the disclosure of which is hereby incorporated by reference herein.

A filtered data signal 311 from the continuous time filter 307 is provided to an automatic gain control ("AGC") circuit 309. Under the control of the automatic gain control circuit 309 the variable gain amplifier 305 may appropriately amplify or attenuate small or large amplitude input signals, respectively, to generate an output signal having relatively constant amplitude.

A data signal 311 from the continuous time filter 307 is added with a signal from a tail distribution optimizer 389. This combined signal 323 is then provided to a two tap decision feedback equalizer 315 and clock and data recovery circuit 327. The decisions feedback equalizer 315 combines the data signal 323 with two equalized feedback signals to generate a soft decision data signal 319. A hard decision data signal 325 or a binary data signal is also generated. In this embodiment, the binary signal 325 is retimed by retiming functions 321 to generate a recovered data signal 397 and is used to perform phase detection operations for clock and data recovery 327.

The clock and data recovery circuit 327 works with a phase adjust circuit 395 to extract a 10 GHz clock signal 331 (in this 10 Gbps example) from the binary data signal 325 by, for example, aligning the rising edge of the extracted clock with transitions in the binary signal 325. In this way, the clock and data recovery circuit 327 may maintain the proper timing relationship between the binary data signal 325 and the clock signal 331 that clocks the binary data signal 325.

In one embodiment, the phase adjuster 395 is controlled to adjust the phase of the clock 331. That is, the signal 377 creates an offset in the detected phase relationship between the clock signal generated by the CDR 327 and the binary data signal 325. As a result, the dithering algorithm circuit 373 may further reduce the mean square error of the received signal. Examples of decision feedback equalizers with adjustable delay are disclosed in U.S. patent application Ser. No. 10/774,725, filed Feb. 9, 2004, the disclosure of which is hereby incorporated by reference herein. In this two tap decision feedback equalizer implementation and retimer 321 circuit implementation, the output of the retimer 321 provides a recovered data signal 397 that consists of equalized data that has been recovered from the incoming data signal 303.

In one embodiment, a demultiplexer ("DEMUX") 351 demultiplexes the recovered data signal 397 to generate parallel data signals that are clocked at a slower rate. For example, in FIG. 3 the demultiplexer 351 generates sixteen parallel data signals 353 at a rate of 622 Mbits per second ("Mbps").

In one embodiment, the decision feedback equalizer 315 has an internal feedback loop. The internal feedback signals are multiplied by equalization coefficients G1 and G2 361 (typically negative numbers) and the resulting scaled equalized feedback signals are added by an internal summer with the data signal 323. Thus, the decision feedback equalizer 315 typically subtracts a scaled version of the previous symbols from a current (that is, current, in time) symbol to reduce or eliminate channel induced distortion such as inter-symbol interference.

In general, the values of the equalization coefficients depend on the level of inter-symbol interference that is present in the incoming data. Typically the absolute value of an equalization coefficient (usually a negative number) increases with increasing inter-symbol interference. In some embodiments, a least mean square ("LMS") algorithm circuit 357 calculates an error associated with an equalized signal (e.g., the soft decision signal 319) and adjusts the values of the equalization coefficients in accordance with the error.

As mentioned above, an error signal may be generated from the soft decision signal 319. In FIG. 3, the analog to digital converter 363 samples the soft decision signal 319 to generate digital signals that are provided to a digital automatic gain control circuit ("DAGC") 365. The digital output of the digital automatic gain control circuit 365 is provided to the LMS algorithm circuit 357 and the dithering algorithm circuit 373.

In the embodiment of FIG. 3, the components 357, 365, 373, 389 and 393 are implemented in the digital domain. Accordingly, these components may be implemented, for example, as microcode for microprocessors, programmable logical grid arrays, as a state machine, a processor with associated software or similar structures and devices.

In one embodiment, the analog to digital converter 363 samples the soft decision signal 319 using a 155 MHz clock signal 369 generated by the delay lock loop 367. The relative phase of the clock signal 369 determines the point in time in a given symbol at which the analog to digital converter 363 samples the symbol. The optimum point in time to sample a symbol may depend on the characteristics of the channel.

In one embodiment, the delay lock loop 367 works in conjunction with a delay circuit 381 that may be used to control the phase delay of the clock signal 369. An relative error circuit 393 may adjust the signal 379 to vary the point at which the analog to digital converter 363 samples symbols from the soft decision signal 319. In this way the analog to digital converter 363 can be controlled to sample at approximately the same point in time as the retimer 321. The relative error circuit 393 adjusts the correction signal 379 based on output signal 353 and the DAGC output signal 391.

Figure 4A:
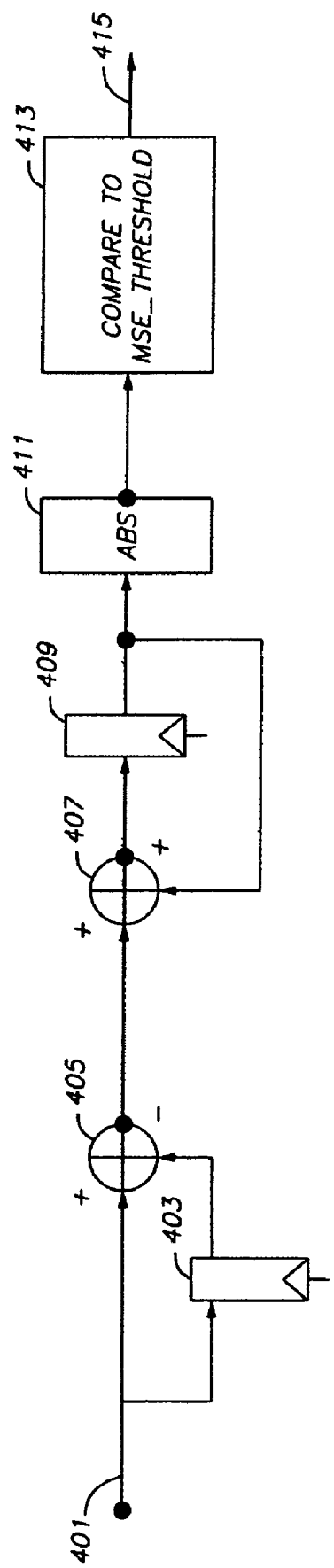
FIG. 4A is a diagram of one embodiment of a circuit to compare a change in an error value with a threshold value.
Figure 4C:
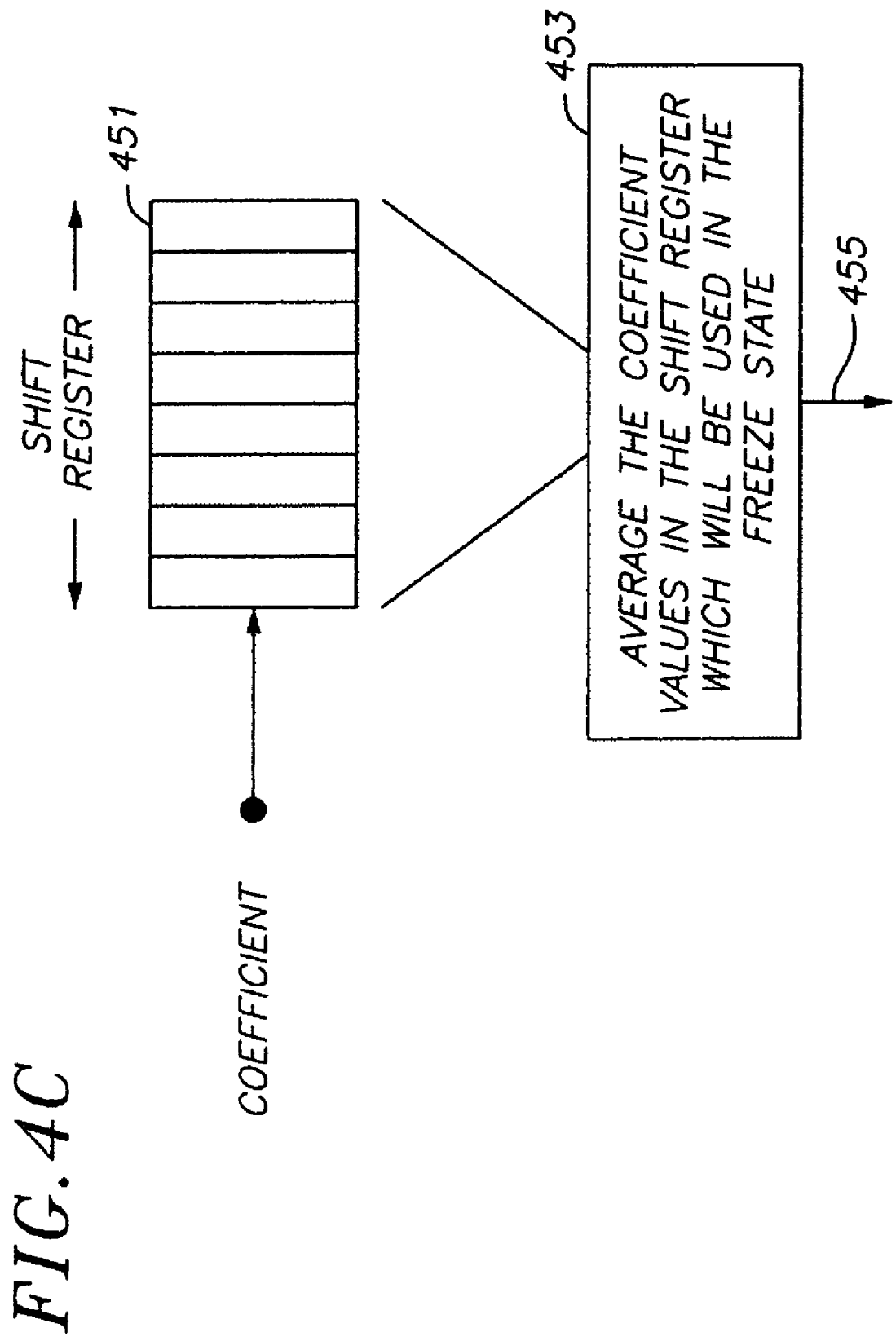
FIG. 4C is a diagram of one embodiment of a circuit to average a set of coefficient related values.

FIGS. 4A-C are diagrams of circuits that are part of one embodiment of the dithering device. These circuits generate input and track information utilized by the state machine. These circuits may be machine coded, hard wired or similarly implemented.

FIG. 4A is a diagram of one embodiment of a summation circuit. This circuit tracks the cumulative change in an error signal over time. The tracking information is used to change the state of the state machine out of a freeze state. In one embodiment, the circuit may receive a newly calculated error signal (e.g., a MSE) at an input 401. The new error signal is stored in (e.g., clocked into) a storage device 403. The storage device may be reset each time the state machine enters a freeze state. The prior error signal stored in storage unit 403 is subtracted or similarly compared to the new error signal by a subtractor 405 or similar device.

The difference between the new error signal and the old error signal is then added to a prior accumulator value. The accumulator value may be stored in a second storage device 409. The value in the accumulator may be added to the difference of the error signal by an adder device 407 or similar device. The result of the adder is then stored in (e.g., clocked into) the storage structure 409 as the new accumulated value.

The accumulated value is processed by an absolute value device 411 and passed onto a comparator 413. The comparator 413 compares the absolute value of the accumulated change of the error signal to a threshold value. This detects a change in the error signal in either direction. If the threshold value is met then the circuit outputs an indicator 415 that the state machine may base a move out of the freeze state upon in addition to or combination with other criteria.

FIG. 4B is a diagram of one embodiment of a set of comparator devices that drive the transition between the other states in the dithering device. The circuit includes a storage device 421 to store a set of values related to the change in value of a coefficient over time. The storage device 421 may be a shift register or similar device. The storage device 421 may store any number of indicators. In one embodiment, the storage device 421 has space for eight indicators. An indicator is a quantification or approximation of a change in a coefficient at a sampling time (e.g., a +1 represents a positive change of the coefficient and a −1 represents a negative change of the coefficient). The storage device 421 stores the last eight to sixteen or similar quantity of indicators sampled. In one embodiment, the indicators may be a positive value (e.g., +1), zero, and negative value (e.g., −1). The positive and negative values may indicate a change in the coefficient in each direction, that is a larger or smaller error. A zero may represent a lack of change in the coefficient value. The values in the storage structure 421 may be continuously updated as new samples of the coefficient value are taken. The old values are replaced over time or shifted out of the storage structure 421.

In one embodiment, the indicators stored in storage structure 421 are summed by an adder 423 or similar device and the resulting sum is input to an absolute value calculation device 425. The resulting absolute value indicates the total amount of change for the coefficient value over the preceding eight or similar number of samples. This summation value is provided to a set of comparators that correspond to state transitions. Each comparator has an association with a state change and a threshold value that is necessary to effect the change between states. The comparators include a fine state to freeze state comparator 427 that enables the transition between these states when a threshold value is met. This enable signal may be utilized in conjunction with other criteria to enable a transition to the freeze state. Other criteria may include a counter that ensures that sufficient data has been collected. A second comparator 429 is a fine to coarse comparator that compares the summation with a separate threshold. A third comparator 431 compares the summation to a coarse to fine threshold. If the threshold is met and other criteria are met then the enable signal transitions the state to the coarse state from the fine state and the fine state from the coarse state, respectively.

FIG. 4C is a diagram of one embodiment of a optimal value generation device. In one embodiment, the optimization process (e.g., in a dithering device) may determine an optimal value for a parameter, such as a coefficient, for the freeze state. The value may be determined using an average of the previous eight values or a similar number of prior values suitable for determining an average. The device may include a storage device 451 to track a predetermined number of prior values. This set of values may be input into an averaging circuit or similar device to determine their average. This average output 455 may be sent to the device controlled by the optimization process.

The systems and methods described herein may be integrated into any of a variety of applications. For example, referring to FIG. 5, the described exemplary dithering device may be incorporated into an optical receiver assembly 511 of an optical communication system 500. The optical system 500 includes an optical transmitter 521 and an optical fiber network 531 that carries the optical signal to the optical receiver assembly 511. Those skilled in the art will appreciate that the teachings of the invention are not limited to a single optical transmitter and receiver or to optical receivers. For example, practical optical communications systems may have one or more optical transmitters as well as one or more optical receivers.

The illustrated receive path includes an optical detector 535, sensing resistor 541, one or more amplifiers 551, and an integrated decision feedback equalizer and clock and data recovery circuit 561. The optical detector 535 may comprise a known prior art optical detector implementation. Such prior art detectors convert incoming optical signals into corresponding electrical output signals that may be electronically monitored.

A transmit path includes, by way of example, one or more gain stages 571 coupled to an optical transmitter 575. The gain stages 571 may have multiple stages, and may receive one or more control signals for controlling various different parameters of the output of the optical transmitter. In one embodiment an analog data source provides an analog data signal that modulates the output of the optical transmitter. In other embodiments, baseband digital modulation or frequency modulation may be used.

In this embodiment, the gain stages 571 amplify the incoming data signal from the data source according to laser control signals. The amplified data signal, in turn, drives the optical transmitter 575.

The optical transmitter may, for example, be a light emitting diode or a surface emitting laser or an edge emitting laser that operate at high speeds such as 10 Gigabits per second ("Gbps") or higher. The optical transmitter 575 thereby generates an optical data signal that provided to a fiber optic cable 531.

The fiber optic cable 531 carries the optical data signal to the optical detector 535. In operation, when the transmit optical beam is incident on a light receiving surface area of the optical detector, electron-hole pairs are generated. A bias voltage applied across the optical detector 535 generates a flow of electric current having intensity proportional to the intensity of the incident light. In one embodiment, this current flows through sensing resistor 541, and generates a voltage.

The sensed voltage is amplified by the one or more amplifiers 551 and the output of amplifiers 551 drives the integrated decision feedback equalizer and clock and data recovery circuit 561. The decision feedback equalizer may include, by way of example, a slicer that generates a binary signal that drives a clock and data recovery circuit. The clock and data recovery circuit generates an extracted clock signal from the binary signal that is then used to retime the equalized data as discussed above. One example of an integrated decision feedback equalizer and clock and data recovery circuit is described in U.S. patent application Ser. No. 10/823,252, filed Apr. 10, 2004, the disclosure of which is hereby incorporated by reference herein.

A receiver constructed according to the invention may support various data protocols and data rates. For example, in one embodiment the receiver is a multi-rate SONET/SDH/10GE/FEC receiver that may operate at very high speeds including, for example, 9.953, 10.3125, 10.664 or 10.709 Gbps. This receiver includes, in a single chip solution, an optical equalizer and CDR as discussed above, a linear amplifier, deserializer and other components.

In one embodiment, the receiver chip is implemented using CMOS technology. However, the teachings herein are applicable to other types of processes including for example, GaAs, Bi-MOS, Bipolar, etc. Moreover, different types of transistors such as NFETS and PFETS may be used to implement circuits according to the teachings herein.

A system constructed in accordance with the invention may be implemented in a variety of ways. For example, a dithering device and optimization process as taught herein may be used to control one, two or more loops in a receiver. These loops may, in turn, control a variety of parameters or characteristics of a system including, but not limited to, the parameters discussed above.

Different embodiments of the invention may include a variety of hardware and software processing components. In some embodiments of the invention, hardware components such as controllers, state machines and/or logic are used in a system constructed in accordance with the invention. In some embodiment of the invention, code such as software or firmware executing on one or more processing devices may be used to implement one or more of the described operations. Similarly, different embodiments of the invention may include components implemented in microcode, programmable grid arrays and similar technologies.

Such components may be implemented on one or more integrated circuits. For example, in some embodiments several of these components may be combined within a single integrated circuit. In some embodiments some of the components may be implemented as a single integrated circuit. In some embodiments, some components may be implemented as several integrated circuits.

The components and functions described herein may be connected/coupled in many different ways. The manner in which this is done may depend, in part, on whether the components are separated from the other components. In some embodiments, some of the connections represented by the lead lines in the drawings may be in an integrated circuit, on a circuit board and/or over a backplane to other circuit boards.

The signals discussed herein may take several forms. For example, in some embodiments a signal may be an electrical signal transmitted over a wire while other signals may consist of light pulses transmitted over an optical fiber. A signal may comprise more than one signal. For example, a differential signal comprises two complementary signals or some other combination of signals. In addition, a group of signals may be collectively referred to herein as a signal.

Signals as discussed herein also may take the form of data. For example, in some embodiments an application program may send a signal to another application program. Such a signal may be stored in a data memory.

The components and functions described herein may be connected/coupled directly or indirectly. Thus, in some embodiments there may or may not be intervening devices (e.g., buffers) between connected/coupled components.

The invention described herein generally relates to an improved system and method for optimizing values in a continuously changing environment, including application for error reduction in received signals. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A device comprising:
an error calculation circuit to determine an error rate for a communication signal;
a processing circuit to adjust the communication signal based on a coefficient associated with the processing circuit; and
a dithering circuit to adjust the coefficient associated with the processing circuit via a control signal,
the dithering circuit to adjust the size of change to the coefficient based on a state of the dithering circuit,
the dithering circuit having a freeze state that freezes a coefficient of the processing circuit if a change in the coefficient over time meets a threshold value.

2. The device of claim 1, wherein the control signal value is based on the error rate, and wherein the error rate is a mean squared error for a communication signal.

3. The device of claim 1, further comprising: a freeze state exit circuit that compares an accumulated change to the error rate with a freeze state exit threshold value.

4. The device of claim 2, wherein the control signal set a coefficient for a continuous time filter, phase adjust circuit, threshold adjustment loop and a decision feedback equalizer.

5. The device of claim 1, wherein the dithering circuit is a state machine with a first state adjusting the coefficient in a large step, a second state adjusting the coefficient in a small step and a third state freezing adjustment to the coefficient.

6. The device of claim 1, further comprising: a storage device to store a set of values related to a change in a coefficient value; and a comparator device in communication with the storage device to compare a sum of the set of values related to the change in the coefficient value with a state threshold value, the comparator to generate a signal to transition a state of the dithering circuit.

7. The device of claim 6, further comprising: an absolute value circuit to generate an absolute value of the sum of the set of values related to the change in the coefficient value.

* * * * *